Oct. 30, 1956 V. J. HOLOPAINEN 2,768,759
POWER OPERATED SHOVELS
Original Filed Aug. 2, 1950 3 Sheets-Sheet 1
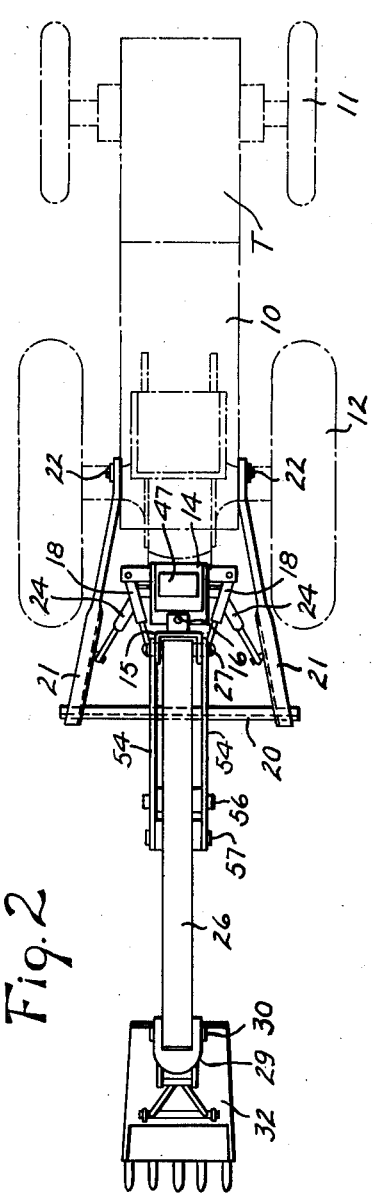
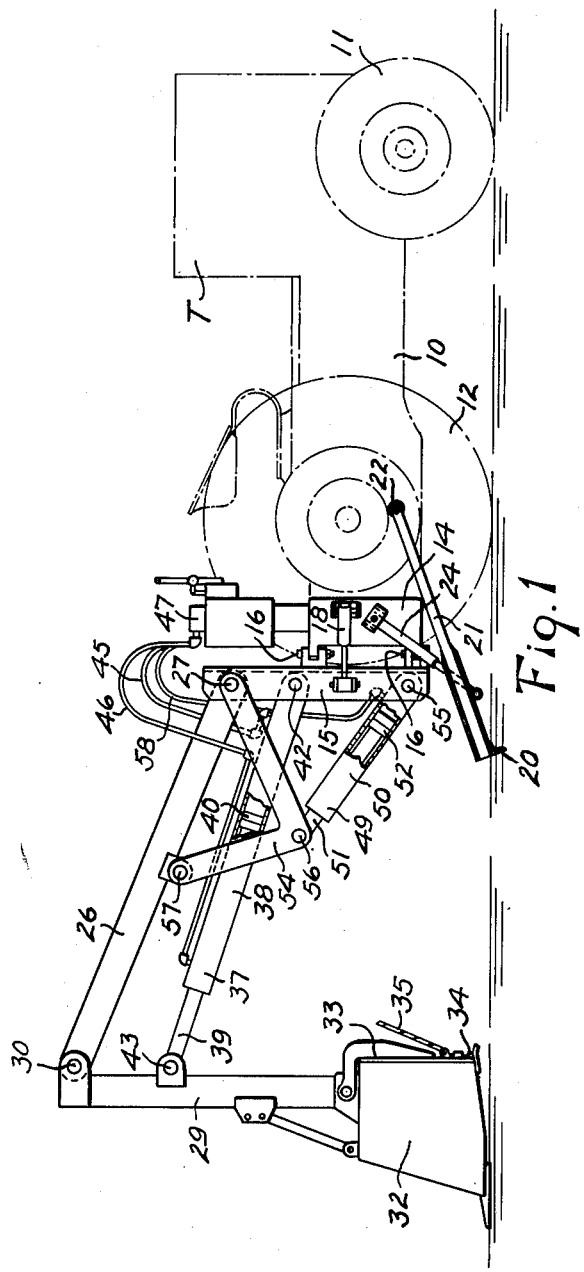
INVENTOR.
VAINO J. HOLOPAINEN
BY
Albert G. Blodgett
ATTORNEY Oct. 30, 1956  V. J. HOLOPAINEN  2,768,759
POWER OPERATED SHOVELS
Original Filed Aug. 2, 1950  3 Sheets-Sheet 2
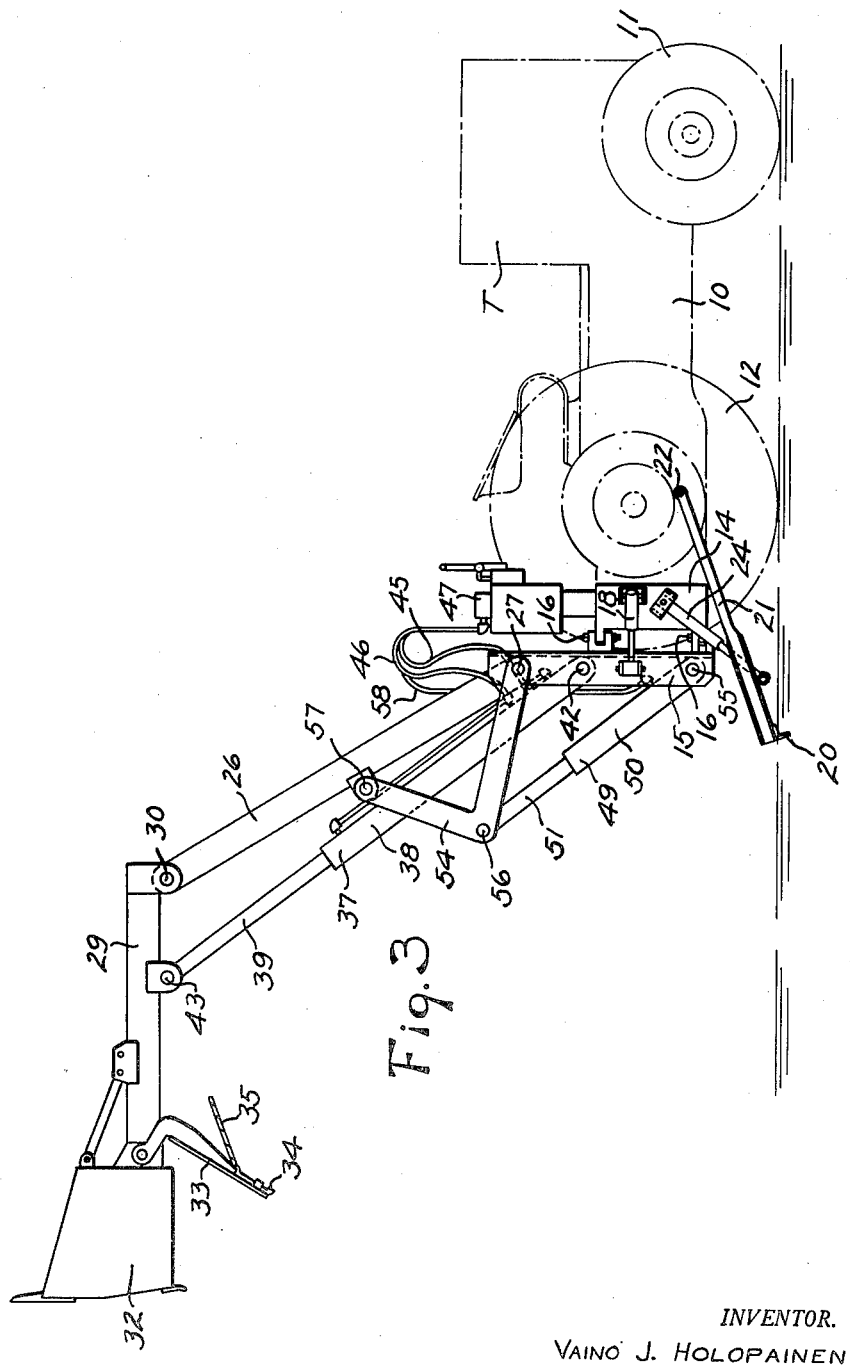
INVENTOR.
VAINO J. HOLOPAINEN
BY
Albert G. Blodgett
ATTORNEY Oct. 30, 1956  V. J. HOLOPAINEN  2,768,759
POWER OPERATED SHOVELS Original Filed Aug. 2, 1950  3 Sheets—Sheet 3

INVENTOR.
VAINO J. HOLOPAINEN
BY
Albert G. Blodgett
ATTORNEY

United States Patent Office 2,768,759
Patented Oct. 30, 1956

2,768,759

POWER OPERATED SHOVELS

Vaino J. Holopainen, Hubbardston, Mass., assignor to Wain-Roy Corporation, Hubbardston, Mass., a corporation of Massachusetts Continuation of abandoned application Serial No. 177,309, August 2, 1950. This application October 20, 1953, Serial No. 387,123

4 Claims. (Cl. 214—138)

This invention relates to power operated shovels, and more particularly to a shoveling apparatus adapted to be mounted on a farm tractor or the like. The specific machine described herein is mounted on the rear portion of the tractor and includes a bucket which moves rearwardly away from the tractor on its digging stroke. This application is a continuation of patent application Serial Number 177,309 filed August 2, 1950, now abandoned.

It is one object of the invention to provide a power operated shovel which is of a simple, rugged and thoroughly dependable construction.

It is a further object of the invention to provide a power operated shovel having a bucket and hydraulic motors arranged to move the bucket positively in desired directions.

It is a further object of the invention to provide a power operated shovel having a bucket and hydraulic motors of a comparatively simple and compact construction so connected to the various parts of the apparatus as to provide very powerful forces when required for filling and elevating the bucket.

In accordance with the invention there is provided a frame structure which preferably includes a frame extension adapted to be mounted on the frame of a tractor and a supporting member pivotally mounted on the frame extension for swinging movement about a substantially vertical axis. A boom is pivotally connected at one end to the supporting member and extends outwardly therefrom. A dipper stick is pivotally connected adjacent its upper end to the outer end of the boom, and on the lower end of the dipper stick there is mounted a bucket arranged to move outwardly on its digging stroke. The dipper stick is actuated by means of a hydraulic motor located beneath the boom, this motor including a cylinder and piston rod or plunger which form an extensible link. One end of this link is preferably connected to the supporting member and the other end to the dipper stick. The boom is actuated by means of a second hydraulic motor located beneath the first-mentioned motor and likewise including a cylinder and piston rod or plunger which form an extensible link. One end of the last-mentioned link is connected to the lower portion of the supporting member and the other end is connected to the boom by means of a suitable bracket, there preferably being two of these brackets located on opposite sides of the dipper-stick motor.

Referring to the drawing illustrating one embodiment of the invention, and in which like reference numerals indicate like parts, Fig. 1 is a side elevation of a power actuated shovel, with the shovel bucket shown in a lowered position;

Fig. 2 is a top plan view of the apparatus;

Fig. 3 is a view similar to Fig. 1, but with the shovel bucket shown in an elevated position.

Figure 4:
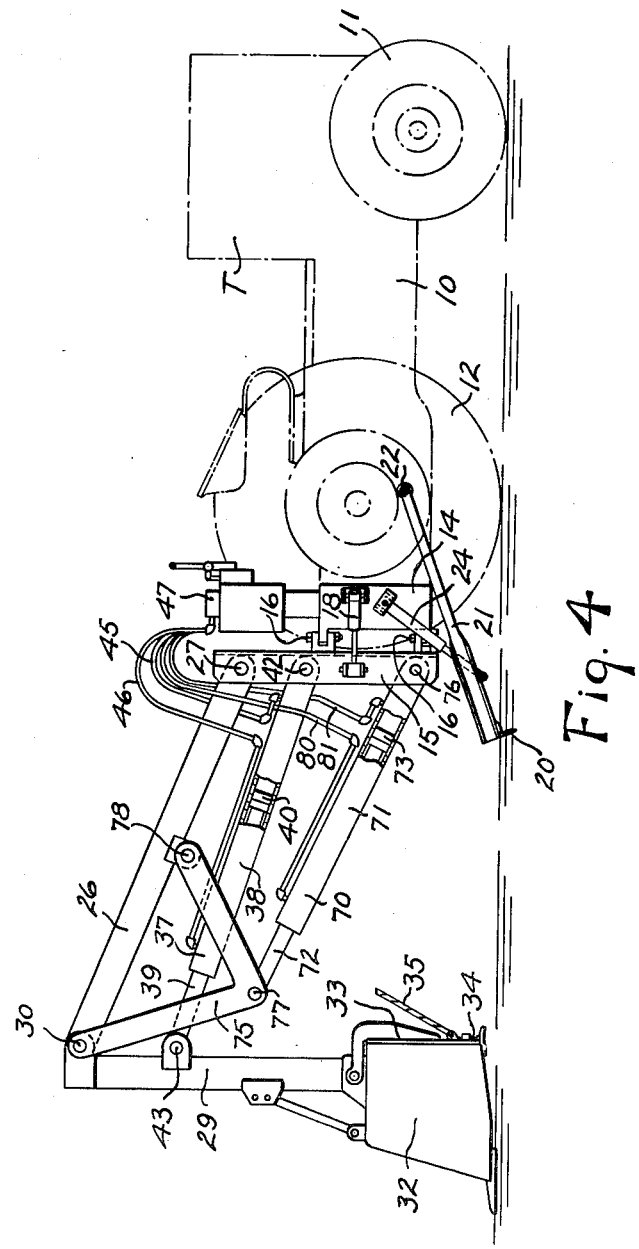
Fig. 4 is a view similar to Fig. 1, but showing a somewhat modified construction.

As shown in Fig. 1, there is provided a farm tractor T of a well-known type having a frame 10, a pair of front wheels 11, and a pair of rear wheels 12. A frame extension 14 is suitably secured to the rear portion of the tractor frame 10. An upright supporting member 15 is located directly behind the frame extension 14 and pivotally connected thereto by two vertically aligned pins or bolts 16 so that the member 15 can swing about a vertical axis. Such swinging movement can be brought about by two single-acting hydraulic motors 18 each of which includes a cylinder and a piston rod forming a substantially horizontal extensible link. These motors or links 18 are located on opposite sides of the frame extension 14, and their opposite ends are pivotally connected to the frame extension and to the supporting member 15 respectively. By admitting fluid into one motor 18 while exhausting fluid from the other, the member 15 can be swung in either direction as desired. A transverse ground-engaging bar 20 is located somewhat to the rear of the tractor T, and arms 21 extend forwardly from the ends of this bar to the opposite sides of the tractor frame 10, to which the front ends of the arms are pivotally connected by suitable pins or bolts 22. Each arm 21 is connected to the adjacent side of the frame extension 14 thereabove by means of a double-acting hydraulic motor 24 each of which includes a cylinder and a piston rod forming an upwardly and rearwardly inclined extensible link. The opposite ends of the motors or links 24 are pivotally connected to the arm 21 and to the frame extension 14 respectively. By proper control of fluid flow to and from the motors 24, the arms 21 and the bar 20 can be raised and lowered as desired. The various parts as so far described are disclosed in my prior patent application Serial No. 38,595 filed July 14, 1948 now Patent No. 2,698,697, of which the present application is a continuation-in-part.

An elongated boom 26 extends in a rearward and upward direction from the upper portion of the supporting member 15, the boom being pivotally connected to the member 15 by a transverse horizontal pin 27 so that the boom may swing in a vertical plane. A dipper stick 29 is pivotally connected at its upper end to the rear or outer end of the boom 26 by a transverse horizontal pin 30. On the lower end of the dipper stick there is mounted a bucket 32 which is open toward the rear and adapted to move rearwardly on its digging stroke. At the front the bucket is closed by a hinged dump plate or door 33 of well-known construction having a retaining latch 34 which can be released by the usual trip cord 35 controlled by the operator of the machine.

In order to swing the dipper stick 29 in the desired manner about the pin 30 at its upper end, there is provided a double-acting hydraulic motor 37 located beneath the boom 26 and comprising a cylinder 38, a piston rod or plunger 39, and a piston 40. These parts form an extensible link with its opposite ends connected respectively to the supporting member 15 and to the dipper stick 29. In the preferred construction the front end of the cylinder 38 is pivotally connected to the supporting member 15 by a transverse horizontal pin 42 located somewhat below the pin 27, and the rear end of the piston rod 39 is pivotally connected to the dipper stick 29 by a transverse horizontal pin 43 located between the pin 30 and the bucket 32. Flexible tubes 45 and 46 connect the front end and the rear end respectively of the cylinder 38 to a manually operable valve mechanism 47 mounted on the top of the frame extension. This mechanism may be of any suitable and well-known construction for controlling the flow of oil through the tubes 45 and 46. Oil may be supplied under pressure to the valve mechanism 47 in known manner by a suitable pump (not shown) driven by the tractor engine.

In order to raise and lower the boom 26 about its pivot pin 27 in a desired manner there is provided a hydraulic motor 49 located beneath the motor 37 and comprising a cylinder 50, a piston rod or plunger 51, and a piston 52. These parts form an extensible link with its opposite ends connected respectively to the supporting member 15 and to a bracket 54 which is attached to the boom 26 and extends downwardly therefrom at one side of the dipper stick motor 37. In the preferred construction the front end of the cylinder 50 is pivotally connected to the lower portion of the supporting member 15 by a transverse horizontal pin 55, and the rear end of the piston rod 51 is pivotally connected to the bracket 54 by a transverse horizontal pin 56. Preferably there are two of the brackets 54, each of V-shape, located on opposite sides of the motor 37, the pin 56 extending through both brackets. The front branches of each bracket are connected at their upper ends to the pin 27 at the upper end of the supporting member 15, and the rear branches are connected at their upper ends by a transverse horizontal pin 57 to the boom 26 at a point intermediate its length. The motor 49 is of the single-acting type, and the front end of the cylinder 50 is connected by a flexible tube 58 to the valve mechanism 47, so that the operator may control the flow of oil to and from the motor 49 in a desired manner.

It will be understood that the valve mechanism 47 is also connected to the motors 18 and 24 by suitable flexible tubes so that the flow of oil to and from these motors can be controlled, as disclosed in my prior application Serial No. 38,595. To avoid unduly complicating the drawings, these tubes have been omitted therefrom.

The operation of the invention will now be apparent from the above disclosure. The tractor T will be driven to the desired position, say adjacent a gravel bank or the like, and the valve mechanism 47 will be actuated as required to admit oil into the upper ends of the stabilizer cylinders 24 and thereby force the stabilizer bar 20 downwardly against the ground. This will provide a rearwardly extended base or support for the tractor, and tend to prevent lifting of the front wheels 11 thereof under the influence of the rearwardly overhanging weight of the loaded bucket 32 and its associated parts. The operator can fill the bucket 32 by manipulating the valve mechanism 47 as required to admit oil into the front end of the cylinder 38, thus extending the rod 39 and swinging the dipper stick 29 rearwardly about its pivot 30. This will force the bucket rearwardly and upwardly into the bank of gravel or other material to be handled. If desired oil may then be admitted to the front end of the boom cylinder 50 as required to extend the rod 51, which will act through the brackets 54 to raise the boom 26 about its pivot 27 and elevate the bucket still further. Oil will thereupon be admitted to one of the motors 18 to turn the supporting member 15 about the pins 16 and thus swing the loaded bucket to one side, say into a position above a truck or the like. The operator will then pull the trip cord 35 to release the latch 34, and gravity will cause the door 33 to open and the load to be discharged from the bucket into the truck. The bucket may then be swung back and lowered into position for further digging.

It will be noted that the construction and arrangement is such that the dipper stick motor 37 will provide a comparatively large force for bringing about the rearward "crowding" movement of the bucket 32, since the oil pressure which produces this movement is effective on the full area of the piston 40. The rod or plunger 39, which must be strong and of considerable diameter to withstand the forces involved, does not reduce the effective area of the front side of the piston. While the rod 39 does considerably reduce the effective area of the rear side of the piston, this is an advantage rather than a detriment, since it makes it possible to swing the bucket in a forward "retreating" movement at a comparatively high speed. It will be understood that for a given rate of oil delivery from the pump, the speed of piston travel will vary inversely with the effective area of the piston. Of course the reduction in effective piston area will reduce the force available, but only a relatively small force is required during the retracting movement of the bucket.

It will also be noted that by mounting the boom motor 49 below the dipper stick motor 37 and employing the brackets 54 which straddle the motor 37, a comparatively large torque radius is made available for raising the boom 26. This radius of course is the distance between the center of the boom pivot pin 27 and the axis of the boom motor 49, measured in a direction perpendicular to the said axis. Furthermore raising of the boom, which requires considerable force, is brought about by extension of the rod or plunger 51, and for such movement of the rod the full area of the piston 52 is available. The rod may therefore be made as large in diameter as desired, to provide ample strength.

In some cases it may be desired to provide a greater angle of vertical movement for the boom 26. In such event a somewhat modified arrangement may be employed to permit a longer stroke for the boom motor. Referring now to Fig. 4, it will be seen that the construction is the same as in Fig. 1 except for the boom motor and the brackets which connect the said motor to the boom. In Fig. 4 there is provided a hydraulic motor 70 located beneath the dipper stick motor 37 and comprising a cylinder 71, a piston rod or plunger 72, and a piston 73. These parts form an extensible link with its opposite ends connected respesctively to the supporting member 15 and to a pair of brackets 75 which are attached to the boom 26 and extend downwardly therefrom on opposite sides of the dipper stick motor 37. The front end of the cylinder 71 is pivotally connected to the lower portion of the supporting member 15 by a transverse horizontal pin 76, and the rear end of the piston rod 72 is pivotally connected to the brackets 75 by a transverse horizontal pin 77. The brackets 75 are V-shaped, with their rear branches connected at their upper ends to the pin 30 at the rear end of the boom, and their front branches connected at their upper ends by a transverse horizontal pin 78 to the boom at a point intermediate its length. With the brackets 75 thus located near the rear end of the boom, the cylinder 71 may be made longer than the cylinder 50 of Fig. 1, thus providing a longer stroke for the piston 73, as compared with the piston 52 of Fig. 1. It will also be noted that the boom motor 70 is made double-acting, there being provided two flexible tubes 80 and 81 which connect the valve mechanism 47 with the rear portion and the front portion respectively of the cylinder 71. By admitting oil to the rear end of the cylinder, a force can be provided, in addition to gravity, to lower the boom 26 and urge the bucket 32 downwardly into the ground, whenever this is desirable for digging purposes.

Having thus described my invention, what I claim as new and desire to secure by Letters Patent is:

1. A digger for use with a vehicle having a rigid frame and front and rear wheels, a supporting member mounted on the said frame, a shovel located behind the vehicle, a dipper stick secured at its lower end to the shovel, a rigid boom pivoted at its front end to said supporting member and at its rear end to said dipper stick, a first double-acting hydraulic jack connected to the dipper stick at a point spaced below the connection of the boom therewith to cause it to rotate about a horizontal axis through its connection to the boom and connected at its other end to the supporting member at a point spaced downwardly from the connection of the boom thereto, a bracket rigidly connected to the intermediate portion of the boom and having an extremity which lies on the side of the first jack away from the boom, valve means selectively to supply a hydraulic fluid to either end of said double-acting hydraulic jack and coactively to remove fluid from the other end thereof, thereby moving the shovel toward and away from the vehicle, pressure in said jack tending to move said shovel on a digging stroke longitudinally of the vehicle and at the same time tending to force the front portion of the tractor strongly against the ground on which the vehicle stands, a second double-acting hydraulic jack for the actuation of the boom connecting the said extremity of the bracket to the supporting member at a point spaced downwardly from the connection of the first jack thereto for the actuation of the boom, the boom, the first jack, and the second jack being connected to the supporting member for pivotal movement about a vertical axis, and means joining the boom and second jack to the said frame, said means comprising a hydraulic cylinder and an associated piston rod for causing the boom and the second jack to rotate about the vertical axis of their connection to the frame.

2. A power operated shovel as recited in claim 1, wherein the bracket is a V-shaped structure and the said extremity is the apex of the structure, the ends of the arms of the structure being attached to the boom.

3. A power operated shovel as recited in claim 1, wherein two brackets are provided, extending downwardly from the boom on opposite sides of the first jack, each bracket being V-shaped and being connected at its apex to the second jack, one branch of each bracket being connected to the boom at the point of attachment thereof to the supporting member and the other branch connected to the boom at a point intermediate of its length.

4. A power operated shovel as recited in claim 1, wherein two brackets are provided extending downwardly from the boom on opposite sides of the first jack, each bracket being V-shaped and being connected at its apex to the second jack, one branch of each bracket being connected to the boom at the point of attachment thereof to the dipper stick and the other branch connected to the boom at a point intermediate of its length.

References Cited in the file of this patent

UNITED STATES PATENTS

| | | |
|---|---|---|
| 2,418,299 | Gorsuch | Apr. 1, 1947 |
| 2,495,144 | Simmonds | Jan. 17, 1950 |
| 2,560,674 | Westall | July 17, 1951 |
| 2,648,449 | Hoover | Aug. 11, 1953 |
| 2,660,816 | Maxwell | Dec. 1, 1953 |

OTHER REFERENCES

Advertising circular of Sherman Products, Inc., Form SP 547, published early summer 1949.